United States Patent
Slovetskiy

(10) Patent No.: US 11,178,131 B2
(45) Date of Patent: Nov. 16, 2021

(54) SYSTEMS AND METHODS RELATED TO ESTABLISHING A TEMPORARY TRUST RELATIONSHIP BETWEEN A NETWORK-BASED MEDIA SERVICE AND A DIGITAL MEDIA RENDERER

(71) Applicant: Telefonaktiebolaget LM Ericsson (publ), Stockholm (SE)

(72) Inventor: Sergey Slovetskiy, Pointe Claire (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 160 days.

(21) Appl. No.: 15/123,000

(22) PCT Filed: Mar. 14, 2014

(86) PCT No.: PCT/IB2014/059832
§ 371 (c)(1),
(2) Date: Sep. 1, 2016

(87) PCT Pub. No.: WO2015/136335
PCT Pub. Date: Sep. 17, 2015

(65) Prior Publication Data
US 2017/0078275 A1    Mar. 16, 2017

(51) Int. Cl.
*H04L 29/06*    (2006.01)
*H04N 21/258*    (2011.01)
(Continued)

(52) U.S. Cl.
CPC ...... *H04L 63/0823* (2013.01); *H04L 63/0807* (2013.01); *H04L 63/0838* (2013.01);
(Continued)

(58) Field of Classification Search
CPC ............ H04L 63/0823; H04L 63/0807; H04L 63/0838; H04L 63/10; H04N 21/25816;
(Continued)

(56) References Cited

U.S. PATENT DOCUMENTS 7,430,755 B1* 9/2008 Hughes ............... H04L 63/0823
 726/3
9,832,517 B2* 11/2017 Jamal-Syed ....... H04N 21/4302
(Continued)

FOREIGN PATENT DOCUMENTS

CN    102750472 A    10/2012
CN    103473261 A    12/2013
(Continued)

OTHER PUBLICATIONS

Intelligent Pervasive Network Authentication; S/Key Based Device Authentication, Lee et al, 2009 (Year: 2009).*
(Continued)

*Primary Examiner* — Jahangir Kabir
(74) *Attorney, Agent, or Firm* — Sage Patent Group

(57) ABSTRACT

Systems and methods related to establishing a temporary trusted relationship between a network-based media service and a device that does not have a trusted relationship with the network-based media service are disclosed. In one embodiment, a method of operation of a first device having a trusted relationship with a network-based media service to establish a temporary trusted relationship between the network-based media service and a second device that does not have a trusted relationship with the network-based media service is provided. In one embodiment, the method of operation of the first device includes obtaining a certificate of the second device, generating a temporary token for the second device based on the certificate of the second device, and sending the temporary token for the second device to a server that provides the network-based media service to thereby pre-authorize the second device for temporary media service.

19 Claims, 10 Drawing Sheets

(51) Int. Cl.
*H04N 21/835* (2011.01)
*H04N 21/436* (2011.01)
*H04W 12/069* (2021.01)

(52) U.S. Cl.
CPC ....... *H04L 63/10* (2013.01); *H04N 21/25816* (2013.01); *H04N 21/43615* (2013.01); *H04N 21/835* (2013.01); *H04W 12/069* (2021.01)

(58) Field of Classification Search
CPC .......... H04N 21/43615; H04N 21/835; H04W 12/06
USPC ............................................................. 726/4
See application file for complete search history.

(56) References Cited

U.S. PATENT DOCUMENTS

| | | | | |
|---|---|---|---|---|
| 9,871,661 | B2* | 1/2018 | Kobayashi | H04L 9/083 |
| 10,178,085 | B2* | 1/2019 | Hajduczenia | H04L 63/083 |
| 2005/0027871 | A1* | 2/2005 | Bradley | G06F 16/951 709/227 |
| 2009/0193526 | A1* | 7/2009 | Sweazey | H04L 9/0894 726/30 |
| 2009/0307759 | A1* | 12/2009 | Schnell | G06F 21/10 726/4 |
| 2011/0219067 | A1* | 9/2011 | Bernosky | H04L 29/12066 709/203 |
| 2011/0225643 | A1 | 9/2011 | Faynberg et al. | |
| 2012/0291140 | A1* | 11/2012 | Robert | G06F 21/10 726/28 |
| 2013/0174223 | A1* | 7/2013 | Dykeman | G06F 21/10 726/4 |

FOREIGN PATENT DOCUMENTS

| | | |
|---|---|---|
| WO | 2011071423 A1 | 6/2011 |
| WO | 2011103916 A1 | 9/2011 |

OTHER PUBLICATIONS

Author Unknown, "Digital Transmission Content Protection Specification vol. 1 (Informational Version)," Digital Transmission Licensing Administrator (DTLA), Revision 1.7, Dec. 14, 2011, Hitachi, Ltd., Intel Corporation, Panasonic Corporation, Sony Corporation, and Toshiba Corporation, pp. 1-84.

Author Unknown, "Series X: Data Networks and Open System Communications: OSI networking and system aspects—Naming, Addressing and Registration," Telecommunication Standardization Sector of International Telecommunication Union (ITU-T), Recommendation X.667, Sep. 13, 2004, ITU, 34 pages.

Faynberg, Igor, et al., "On Dynamic Access Control in Web 2.0 and Beyond: Trends and Technologies," Bell Labs Technical Journal, vol. 16, Issue 2, XP-001569633, 2011, Alcatel-Lucent, Wiley Periodicals, Inc., pp. 199-218.

Goto, Hiroaki, et al., "Design of Network Architecture Using Mobile Gateways for DLNA Devices in Wide Area Networks," Communications and Network, vol. 4, Issue 4, 2012, Scientific Research, pp. 322-331.

Leach, Paul J., et al., "A Universally Unique IDentifier (UUID) URN Namespace," Network Working Group, Request for Comments: 4122, Category: Standards Track, Jul. 2005, The Internet Society, 33 pages.

Lortz, Vic, et al., "DeviceProtection: 1 Service," UPnP Version 1.0, Standardized DCP (SDCP), Version 1.0, Service Template Version: 2.00, Feb. 24, 2011, UPnP Forum, 67 pages.

Oprea, Alina, et al., "Securing a Remote Terminal Application with a Mobile Trusted Device," Proceedings of the 20th Annual Computer Security Applications Conference (ACSAC), Dec. 6-10, 2004, IEEE Computer Society, 10 pages.

Santesson, Stefan, "TLS Handshake Message for Supplemental Data," Network Working Group, Request for Comments: 4680, Category: Standards Track, Sep. 2006, The Internet Society, pp. 1-18.

Thakore, D., "Transport Layer Security (TLS) Authorization Using DTCP Certificate draft-dthakore-tls-authz-04," Transport Layer Security Internet Draft, Jan. 13, 2013, IETF Trust, 12 pages.

International Search Report and Written Opinion for International Patent Application No. PCT/IB2014/059832, dated Nov. 26, 2014, 13 pages.

First Office Action for Chinese Patent Application No. 2014800772185, dated Jan. 28, 2019, 5 pages.

* cited by examiner

SYSTEMS AND METHODS RELATED TO ESTABLISHING A TEMPORARY TRUST RELATIONSHIP BETWEEN A NETWORK-BASED MEDIA SERVICE AND A DIGITAL MEDIA RENDERER

This application is a 35 U.S.C. § 371 national phase filing of International Application No. PCT/IB2014/059832, filed Mar. 14, 2014, the disclosure of which is incorporated herein by reference in its entirety.

FIELD OF THE DISCLOSURE

The present disclosure relates to establishing a temporary trust relationship between a network-based media service and a digital media renderer, and more specifically relates to establishing a temporary trust relationship between a network-based media service and the digital media renderer for a media content push from a trusted device.

BACKGROUND

Network-based media services (e.g., network-based subscription television services) are becoming increasingly popular in today's connected world. For instance, network-based media services are implementing multi-screen solutions to deliver media content to trusted (i.e., previously authenticated and authorized) clients in a server to client architecture. Typically, such solutions are built with proprietary clients that have a trusted relationship with a service account for the network-based media service. More specifically, for network-based media services, both control and media sessions connect to client endpoints in a star configuration (i.e., a Wide Area Network (WAN) server to many Local Area Network (LAN) clients). In order to switch a media session from one device to another device, a new client device needs to send a service request to the server. Moreover, existing service architectures provide access to media content only within the limits of the same user account. All devices consuming content must be mapped to an account of a subscriber of the media service, i.e., provisioned, authenticated, and authorized by the network-based media service.

Consumers today are increasingly mobile and travel with high-definition-capable media devices such as, e.g., laptop computers, tablet computers, smartphones, etc. Further, these consumers often have access to network-based media services (e.g., Internet-based subscription media services such as, for example, Netflix, HBO GO, etc.) on their media devices. While consuming content from their media services on their media devices is satisfactory in many cases, in other cases, it is not. For instance, if a subscriber of a network-based media service visits a friend's home, she may want to view content from her media service on a high-definition television in her friend's home. Against this back-drop, media service providers are seeking to increase their commercial content user base and, as such, would like to enable such a feature because doing so exposes other consumers (i.e., other consumers at the friend's home) to the media service. However, at the same time, media service providers are concerned with enforcing content protection.

Consumer media sharing standards, such as Universal Plug and Play (UPnP) and Digital Living Network Alliance (DLNA), develop specifications for media content sharing of media content between consumer devices (clients) in LANs. In general, DLNA guidelines enable sharing of digital media content between media devices (e.g., televisions, recorders, mobile phones, computers, etc.). DLNA uses UPnP for media management, discovery, and control. DLNA and UPnP define a so-called "3 box model" for media session initiation where a controller device (e.g., a mobile device) initiates a media session between a digital media server (e.g., a computer) and a digital media renderer (e.g., a DLNA compliant television). However, at this time DLNA and UPnP enable sharing of digital media content only among devices on the same LAN. Currently, DLNA and UPnP do not enable sharing of digital media content between consumer devices over a WAN (e.g., the Internet) nor do they allow sharing of media content from a network-based media service to a consumer device.

A system and method for providing wide area DLNA connectivity for sharing media content between consumer devices over a WAN is described in Goto, H. et al., "Design of Network Architecture Using Mobile Gateways for DLNA Devices in Wide Area Networks," Communications and Network, Vol. 4, November 2012, pages 322-331 (hereinafter "Goto"). In this article, a wide area DLNA system is disclosed in which a home gateway and a mobile gateway are located at the boarders of a home LAN and an outside LAN, respectively. The home gateway and the mobile gateway utilize Simple Object Access Protocol (SOAP) to encapsulate and send UPnP messages between the home LAN and the remote LAN to thereby enable wide area DLNA operation.

One issue with the wide area DLNA system disclosed by Goto is that the wide area DLNA system only enables pushing of media content from a media server on the home LAN to a renderer on the outside LAN via a WAN. The wide area DLNA system cannot be used to push media content from a network-based (e.g., Internet based) media service, such as for example an Internet-based subscription media service, to a digital media renderer. Thus, returning to the example above, neither conventional local area DLNA systems nor the wide area DLNA system disclosed by Goto enable the subscriber of the network-based media service to push media content from the network-based media service to the high-definition television in the friend's home. Using technology that is commercially available at the present time, in order to view content from a network-based media service on, e.g., a friend's high-definition television, the subscriber must either connect her mobile device to the high-definition television via a cable (e.g., a High-Definition Multimedia Interface (HDMI) cable) or stream the media content from her mobile device to the high-definition television, e.g., via an Apple TV® digital media device or some other similar device. Pushing media content directly from the Internet television service to the high-definition television in her friend's home using technology that is now commercially available is not possible.

International Patent Application Publication No. WO 2011/071423 A1, entitled METHOD AND ARRANGEMENT FOR ENABLING PLAY-OUT OF MEDIA, describes systems and methods that enable play-out of media from a network-based content provider on a visited device controlled by another device. In general, these systems and methods distribute keys to the content provider and the visited device to enable delivery of encrypted media content from the content provider to the visited device and decryption of the encrypted media content at the visited device. However, this approach utilizes an intermediate network provider to generate the keys and distribute them to the content provider and the visited device. Further, this approach does not provide a mechanism by which the content provider can ensure that the visited device is certified or trusted for the consumption of protected content.

What is desired are improved systems and methods for protected play-out of media content from a network-based media service to a digital media renderer that does not have a trusted relationship with the network-based media service. For instance, there is a need for systems and methods that provide improved content protection at the untrusted digital media renderer.

SUMMARY

Systems and methods related to establishing a temporary trusted relationship between a network-based media service and a device that does not have a trusted relationship with the network-based media service are disclosed. In one embodiment, a method of operation of a first device (e.g., a Digital Media Controller (DMC)) having a trusted relationship with a network-based media service to establish a temporary trusted relationship between the network-based media service and a second device (e.g., a Digital Media Renderer (DMR)) that does not have a trusted relationship with the network-based media service is provided. In one embodiment, the method of operation of the first device includes obtaining a certificate of the second device, generating a temporary token for the second device based on the certificate of the second device, and sending the temporary token for the second device to a server that provides the network-based media service to thereby pre-authorize the second device for temporary media service.

In one embodiment, sending the temporary token includes sending a service request including the temporary token to the server that provides the network-based media service. In one embodiment, the method further includes, in response to sending the service request, receiving a response including a temporary service Uniform Resource Identifier (URI) from the server that provides the network-based media service. Still further, in one embodiment, the temporary service URI is a secure URI, e.g., a Secure Hyper Text Transfer Protocol (HTTPS) URI.

In one embodiment, obtaining the certificate of the second device includes requesting the certificate of the second device from the second device and, in response, receiving the certificate of the second device from the second device. In another embodiment, the certificate of the second device is a Digital Transmission Content Protection (DTCP) certificate of the second device, and obtaining the certificate of the second device includes sending a dummy protected content push request from the first device to the second device and, in response, receiving the DTCP certificate of the second device from the second device.

In one embodiment, the method of operation of the first device further includes performing a trust establishment procedure to establish a trusted relationship between the first device and the second device. Further, in one embodiment, performing the trust establishment procedure includes pushing a verification indicia to the second device and confirming that the verification indicia is correctly displayed by the second device. In another embodiment, the certificate of the second device is a DTCP certificate of the second device, and obtaining the certificate of the second device includes sending a protected content request to the second device to push a verification indicia to the second device for display and, in the process, receives the DTCP certificate of the second device from the second device. In this embodiment, the method further includes confirming that the verification indicia is correctly displayed by the second device prior to sending the temporary token for the second device to the server that provides the network-based media service.

In one embodiment, generating the temporary token for the second device includes generating the temporary token based on the certificate of the second device and a device identifier (ID) of the second device. In another embodiment, generating the temporary token for the second device comprises generating the temporary token based on the certificate of the second device and one or more additional parameters selected from a group consisting of: one or more service parameters and one or more device parameters of the second device.

In one embodiment, the certificate of the second device is a certificate that indicates that the second device is certified for consumption of protected media content. In another embodiment, the certificate of the second device is a DTCP certificate.

In one embodiment, a first device (e.g., a DMC) includes a processor and memory containing instructions executable by the processor whereby the first device is operative to obtain a certificate of the second device (e.g., a DMR) that does not have a trusted relationship with a network-based media service, generate a temporary token for the second device based on the certificate of the second device, and send the temporary token for the second device to a server that provides the network-based media service to thereby pre-authorize the second device for temporary media service. In one embodiment, the device has a trusted relationship with the network-based media service.

In another embodiment, a first device (e.g., a DMC) is adapted to obtain a certificate of a second device that does not have a trusted relationship with a network-based media service, generate a temporary token for the second device based on the certificate of the second device, and send the temporary token for the second device to a server that provides the network-based media service to thereby pre-authorize the second device for temporary media service. In one embodiment, the first device has a trusted relationship with the network-based media service.

In one embodiment, a computer program comprising instructions which, when executed on at least one processor, cause the at least one processor to carry out any one of the embodiments of the method of operation of a device having a trusted relationship with a network-based media service to establish a temporary trusted relationship between the network-based media service and a second device that does not have a trusted relationship with the network-based media service is provided. In another embodiment, a carrier containing the computer program is provided, wherein the carrier is one of an electronic signal, an optical signal, a radio signal, or a computer readable storage medium (e.g., a non-transitory computer readable medium).

In another embodiment, a first device is provided, where the first device includes a means for obtaining a certificate of a second device that does not have a trusted relationship with a network-based media service, a means for generating a temporary token for the second device based on the certificate of the second device, and a means for sending the temporary token for the second device to a server that provides the network-based media service to thereby pre-authorize the second device for temporary media service. In one embodiment, the first device has a trusted relationship with the network-based media service.

In one embodiment, a first device is provided, where the first device includes a pre-authorization module and a protected media content push module. The pre-authorization module is operative to obtain a certificate of a second device that does not have a trusted relationship with a network-based media service, generate a temporary token for the second device based on the certificate of the second device, and send the temporary token for the second device to a server that provides the network-based media service to thereby pre-authorize the second device for temporary media service. The protected media content push module is operative to receive a response including a temporary service URI from the server that provides the network-based media service and send a protected content push request to the second device including the temporary service URI.

In one embodiment, a method of operation of a server that provides a network-based media service is provided. In one embodiment, the method includes receiving, from a first device having a trusted relationship with the network-based media service, a temporary token for a second device that does not have a trusted relationship with the network-based media service; receiving a request from the second device; in response to the request, obtaining a certificate of the second device from the second device; validating the second device based on the certificate of the second device and the temporary token for the second device; and upon validating the second device, starting a media session with the second device.

In one embodiment, the temporary token is based on the certificate of the second device and a device identifier of the second device. In another embodiment, the temporary token is based on the certificate of the second device and one or more service parameters and/or one or more device parameters of the second device.

In one embodiment, receiving the temporary token includes receiving a service request including the temporary token from the first device. Further, in one embodiment, the method further includes, prior to receiving the request from the second device, sending a response to the service request to the first device that includes a temporary service URI. Further, in one embodiment, receiving the request from the second device includes receiving a request from the second device for the temporary service URI. Still further, in one embodiment, the certificate of the second device is a DTCP certificate, and obtaining the certificate of the second device includes, in response to the request from the second device for the temporary service URI, obtaining the DTCP certificate from the second device during a Transport Layer Security (TLS) handshake procedure with the second device.

In one embodiment, validating the second device includes generating a validation token based on the certificate of the second device using the same temporary token generation procedure utilized by the first device to generate the temporary token for the second device, and validating the second device if the validation token matches the temporary token for the second device.

In one embodiment, the method of operation of the server further includes streaming media content to the second device during the media session.

In one embodiment, the temporary token expires once the media session is ended.

In one embodiment, the method of operation of the server further includes associating the media session with an account of the first device for the network-based media service.

In one embodiment, a server that provides a network-based media service includes a processor and memory containing instructions executable by the processor whereby the server is operative to: receive, from a first device having a trusted relationship with the network-based media service, a temporary token for a second device that does not have a trusted relationship with the network-based media service, receive a request from the second device, obtain a certificate of the second device from the second device in response to the request, validate the second device based on the certificate of the second device and the temporary token for the second device, and start a media session with the second device upon validating the second device.

In one embodiment, a server that provides a network-based media service is provided, wherein the server is adapted to receive, from a first device having a trusted relationship with the network-based media service, a temporary token for a second device that does not have a trusted relationship with the network-based media service; receive a request from the second device; in response to the request, obtain a certificate of the second device from the second device; validate the second device based on the certificate of the second device and the temporary token for the second device; and upon validating the second device, start a media session with the second device.

In one embodiment, a computer program comprising instructions which, when executed on at least one processor, cause the at least one processor to carry out the method of operation of a server hosting a network-based media service according to any one of the embodiments above is provided. In one embodiment, a carrier containing the computer program is provided, wherein the carrier is one of an electronic signal, an optical signal, a radio signal, or a computer readable storage medium (e.g., a non-transitory computer readable medium).

In one embodiment, a server that provides a network-based media service is provided, where the server includes a means for receiving, from a first device having a trusted relationship with the network-based media service, a temporary token for a second device that does not have a trusted relationship with the network-based media service; a means for receiving a request from the second device; a means for, in response to the request, obtaining a certificate of the second device from the second device; a means for validating the second device based on the certificate of the second device and the temporary token for the second device; and a means for, upon validating the second device, starting a media session with the second device.

In one embodiment, a server that provides a network-based media service is provided, wherein the server includes a temporary service request processing module and a media content request processing module. The temporary service request processing module is operative to receive, from a first device having a trusted relationship with the network-based media service, a service request comprising a temporary token for a second device that does not have a trusted relationship with the network-based media service; and, in response, send a response including a temporary service URI to the first device. The media content request processing module is operative to receive a request from the second device for the temporary service URI; in response to the request, obtain a certificate of the second device from the second device; validate the second device based on the certificate of the second device and the temporary token for the second device; and upon validating the second device, start a media session with the second device.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed for pushing digital media content from a network-based media service to a device (e.g., a Digital Media Renderer (DMR)) that does not have a trusted relationship with the network-based media service, which may be referred to herein as an untrusted device. As used herein, "digital media content" is any type of digital audiovisual, or multimedia, content such as, for example, television shows, movies, etc. Further, a "network-based media service" is a service provided by a digital media content provider to provide delivery (e.g., streaming) of digital media content to users (e.g., subscribers) of the network-based media service over a Wide Area Network (WAN) (e.g., the Internet).

Figure 1:
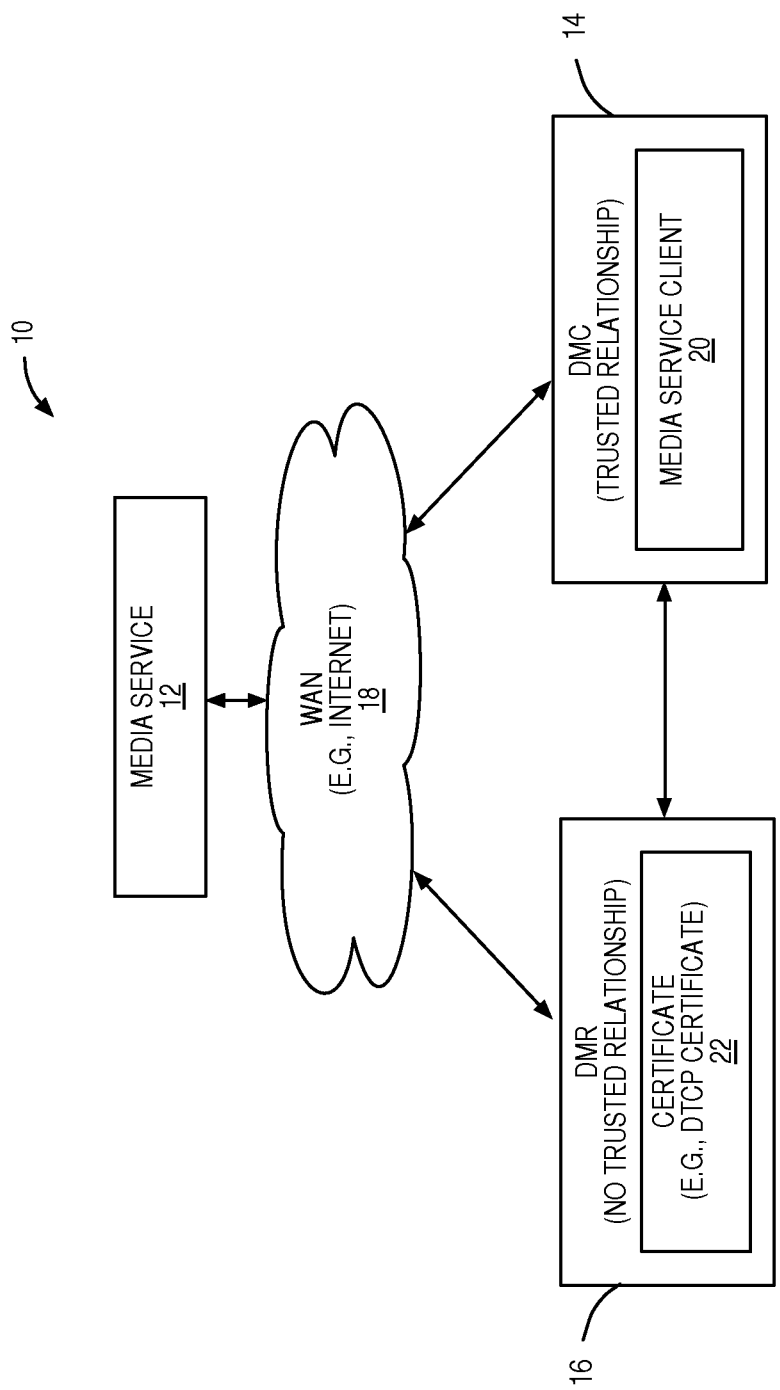
FIG. 1 illustrates a system that enables establishment of a temporary trust relationship between a network-based media service and a Digital Media Renderer (DMR) that does not have a trusted relationship with the network-based media service and delivery of media content according to the temporary trust relationship according to one embodiment of the present disclosure.

In this regard, FIG. 1 illustrates a system 10 according to one embodiment of the present disclosure. The system 10 includes a network-based media service 12 (hereinafter referred to simply as media service 12) that is accessible to a Digital Media Controller (DMC) 14 and a DMR 16 via a WAN 18. While not illustrated, the network-based media service 12 is hosted by a server computer (hereinafter referred to simply as a server) or multiple servers in a collaborative manner (e.g., for load sharing and/or redundancy). The DMC 14 and the DMR 16 may be referred to by different names, particularly in different protected content sharing specifications. For example, in Digital Living Network Alliance (DLNA), the term "Digital Media Controller" is used for the DMC 14, whereas in Universal Plug and Play (UPnP) the DMC 14 may alternatively be referred to as a control point. Similarly, the DMR 16 may be referred to as either a digital media renderer or simply as a media renderer depending on the specification. The DMC 14 and the DMR 16 are connected or are enabled to communicate via any suitable type of local connection, which may be either a wired connection (e.g., Universal Serial Bus (USB) or wired Ethernet connection to a Local Area Network (LAN)) or a wireless connection (e.g., Bluetooth or a wireless LAN). However, in one preferred embodiment, the DMC 14 and the DMR 16 communicate with one another over a wireless LAN.

The DMC 14 is a consumer device. More particularly, in one embodiment, the DMC 14 is a mobile device such as, for example, a laptop computer, a tablet computer, a smartphone, or the like. The DMC 14 includes a media service client 20, which in one embodiment is implemented in software (e.g., a software application). However, the media service client 20 may be implemented in any desired manner, e.g., software, hardware, or a combination thereof. As discussed below, the DMC 14 has a trusted relationship with the media service 12 (i.e., the DMC 14 is a trusted device). The DMC 14 controls delivery of media content from the media service 12 to the DMR 16, e.g., via a protected content push. The DMC 14 has or can establish a trusted relationship with the media service 12 in any suitable manner. In one embodiment, the DMC 14 has or establishes a trusted relationship with the media service 12 by being associated with, or linked to, a user account of a subscriber of the media service 12 (e.g., the subscriber may log into her user account with the media service 12 via the media service client 20).

The DMR 16 is a device having the capability to render media content from the media service 12. In one embodiment, the DMR 16 is a high-definition television. However, the DMR 16 may be other types of devices such as, for example, a set-top box that is connected to a high-definition television, a media player (e.g., a Blu-ray player), a digital media extender (e.g., an Apple TV® device, a Chrome Cast device, or the like), or any similar device capable of rendering media content via an integrated display (e.g., in the case of a television) or a connected display (e.g., a television connected to the DMR 16 via a High-Definition Multimedia Interface (HDMI) cable). The DMR 16 does not have a trusted relationship with the media service 12, at least initially. As such, the DMR 16 is referred to herein as an untrusted device. As discussed below, the DMR 16 is pre-authorized by the DMC 14 for a temporary media session. Through this pre-authorization process, a temporary trusted relationship is established between the DMR 16 and the media service 12. As such, during the temporary media session, the DMR 16 may therefore be considered as a temporary trusted device. However, the DMR 16 generally does not have a trusted relationship with the media service 12 and, as such, is referred to herein as an untrusted device.

The DMR 16 has (i.e., stores) a certificate 22 for the DMR 16. In one embodiment, the certificate 22 indicates that the DMR 16 is certified or otherwise approved for consumption of protected content. In one particular embodiment, the certificate 22 is a Digital Transmission Content Protection over Internet Protocol (DTCP-IP) certificate, which may also be referred to herein as a DTCP certificate or a Digital Transmission Licensing Administrator (DTLA) certificate. In this case, the certificate 22 indicates that the DMR 16 is certified by DTLA for consumption of protected content. The certificate 22 may, in some embodiments, be stored in the DMR 16 during manufacturing (i.e., before reaching the consumer).

Figure 2:
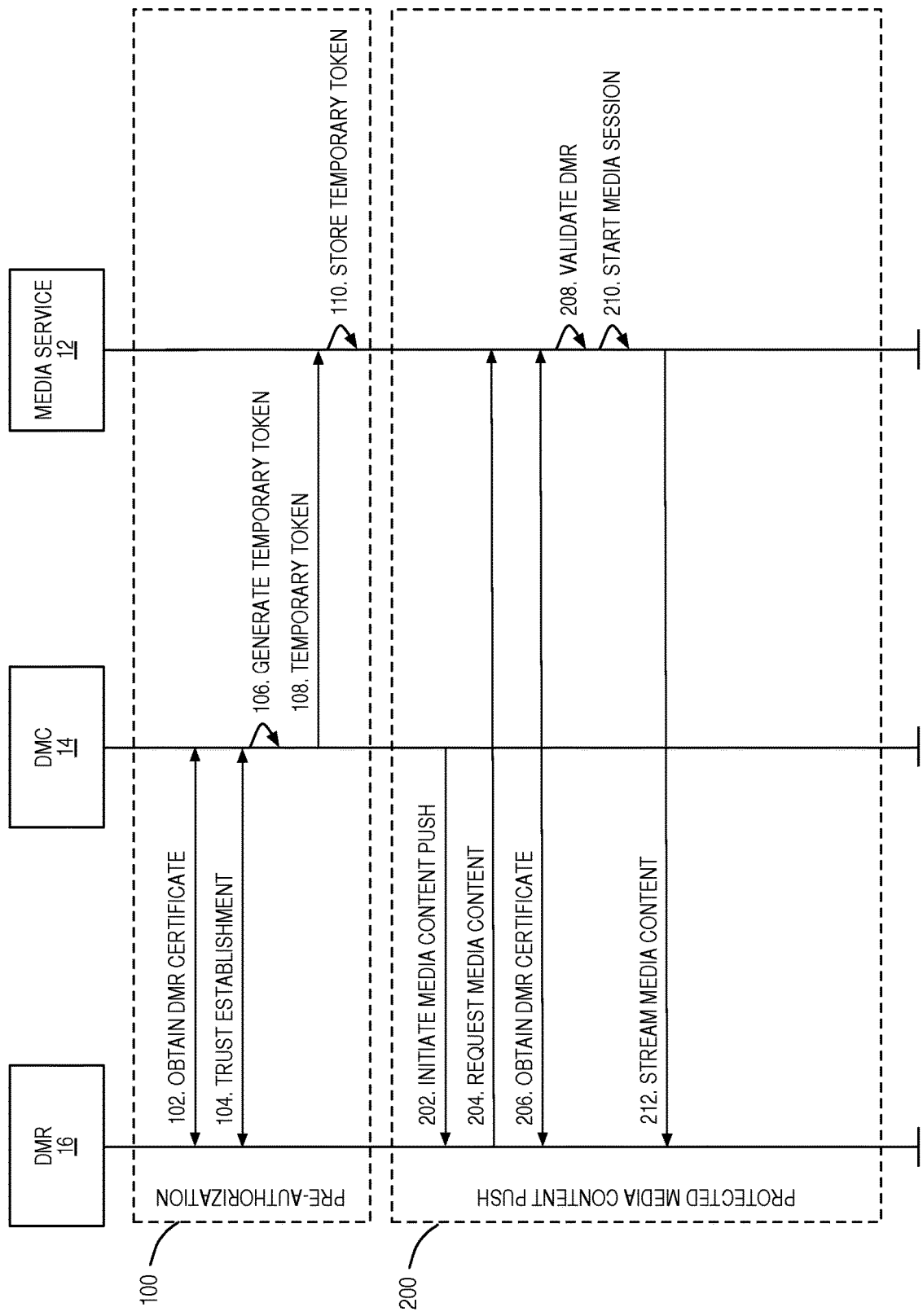
FIG. 2 illustrates the operation of the system of FIG. 1 according to one embodiment of the present disclosure.

As discussed below in detail, the media service 12 (or more specifically a server hosting or providing the media service 12), the DMC 14, and the DMR 16 operate according to a 3-box model to enable the DMC 14 to push media content from the media service 12 to the DMR 16 over the WAN 18 in a secure or protected manner. In this regard, FIG. 2 illustrates the operation of the system 10 according to one embodiment of the present disclosure. Notably, while the media service 12 is illustrated in FIG. 2 for clarity and ease of discussion, it should be recognized that the functionality of the media service 12 is performed by a server(s) hosting the media service 12.

As illustrated, two primary processes are performed, namely, a pre-authorization process 100 and a secure or protected media content push process 200. In general, the DMC 14 is a trusted device of the media service 12, and the pre-authorization process 100 is a process by which the DMC 14 endorses, or pre-authorizes, the DMR 16 for a temporary media session (e.g., a one-time media session) based on the certificate 22 of the DMR 16. Once the DMR 16 is pre-authorized for a temporary media session, the DMC 14 pushes media content from the media service 12 to the DMR 16 over the WAN 18 in a temporary media session.

More specifically, during the pre-authorization process 100, the DMC 14 obtains the certificate 22 of the DMR 16 from the DMR 16 (step 102). In some embodiments, in addition to obtaining the certificate 22 of the DMR 16 from the DMR 16, the DMC 14 also obtains a device identifier (ID) of the DMR 16 from the DMR 16. This device ID of the DMR 16 may be, for example, a UPnP Universal Unique ID (UUID) of the DMR 16, which may be obtained during device discovery. As discussed above, in one embodiment, the certificate 22 of the DMR 16 is a DTCP certificate. In this case, the DTCP certificate includes a device ID (Xid) of the DMR 16, which may be extracted by the DMC 14. In addition to or as an alternative to the Xid, in one embodiment, the DMC 14 obtains a device ID, e.g., a UPnP UUID, of the DMR 16 in addition to the DTCP certificate.

Optionally, in some embodiments, the DMC 14 operates to establish a trusted relationship with the DMR 16 (step 104). This trusted relationship may be established using, e.g., a proximity authentication process. For example, in one embodiment, the DMC 14 performs a protected push of a verification indicia (e.g., an image or CAPTCHA of a character sequence) to the DMR 16 and then requests confirmation from a user of the DMC 14 that the correct verification indicia is displayed by the DMR 16. However, other procedures may be used to establish a trusted relationship between the DMC 14 and the DMR 16. Note that while the trust establishment procedure is illustrated as being performed after obtaining the certificate 22 of the DMR 16, the trust establishment procedure may be performed prior to or as part of the process used to obtain the certificate 22 of the DMR 16 from the DMR 16.

Next, based on the certificate 22 of the DMR 16, the DMC 14 generates a temporary token to authorize a media session for the DMR 16 (step 106). In one embodiment, the temporary token is based on the certificate 22 of the DMR 16. In another embodiment, the temporary token is based on both the certificate 22 of the DMR 16 and a device ID of the DMR 16. The device ID of the DMR 16 can be any unique ID or combination of IDs of the DMR 16 such as, for example, a device ID included in the certificate 22 (e.g., an Xid obtained from a DTCP certificate of the DMR 16), a UUID of the DMR 16 provided in UPnP/DLNA device discovery between the DMC 14 and the DMR 16 (e.g., a UUID of the DMR 16 in a UPnP advertisement), or a Media Access Control (MAC) address of the DMR 16. While the device ID of the DMR 16 is not necessary for the temporary token, in some embodiments, the device ID of the DMR 16 enhances the temporary trust relationship between the media service 12 and the DMR 16. In addition to the certificate 22 and, in some embodiments, the device ID of the DMR 16, the temporary token may be based on one or more service parameters (e.g., service ID, session ID, requested content ID, etc.).

Several examples of the temporary token and the manner in which the temporary token is generated will now be described. Note, however, that these are just examples. In one embodiment, the temporary token is a signed version of the certificate 22 of the DMR 16 (i.e., the certificate 22 signed by the DMC 14). This may be represented as:

temporary token=DMC.sign(DMRcertificate), where "DMRcertificate" is the certificate 22 of the DMR 16 and DMC.sign(X) represents the signing "X" with a certificate of the DMC 14. In another embodiment, the DMC 14 generates the temporary token by first hashing the certificate 22 of the DMR 16 and then signing the hashed certificate with a certificate of the DMC 14. In this case, the temporary token may be represented as:

temporary token=DMC.sign(DMC.hash(DMRcertificate)), where DMC.hash(X) is a hash function that returns a hash of "X." In one embodiment, the DMC 14 generates the temporary token by hashing the certificate 22 of the DMR 16, adding (or appending) one or more additional parameters to the hashed certificate, and then signing the result. In this case, the temporary token may be represented as:

temporary token=DMC.sign(DMC.hash(DMRcertificate)+addParams), where "addParams" is the one or more additional parameters. The one or more additional parameters may include, e.g., one or more service parameters such as, for example, a service ID (e.g., an ID of an Internet Protocol Television (IPTV) service), a session ID (e.g., a session ID of a streaming media session between the media service 12 and the DMC 14 when a decision is made to push the media session to the DMR 16), a user or subscriber ID for the media service 12, and/or a media content item (or asset) ID (e.g., an ID of a specific movie or television show to watch), or a UUID according to Leach, P. et al., A Universally Unique Identifier (UUID) URN Namespace, Request for Comments 4122, July 2005 (hereinafter "RFC 4122") or to the Recommendation ITU-T X.667 "Information technology—Open Systems Interconnection—Procedures for the operation of OSI Registration Authorities: Generation and registration of Universally Unique Identifiers (UUIDs) and their use as ASN.1 object identifier components," September 2004, or the like.

In another embodiment, the DMC 14 generates the temporary token by hashing the certificate 22 of the DMR 16, adding (or appending) a UPnP UUID of the DMR 16 to the hashed certificate, and then signing the result. In this case, the temporary token may be represented as:

temporary token=DMC.sign(DMC.hash(DMRcertificate)+DMR_UUID), where DMR_UUID is the UPnP UUID of the DMR 16. In another embodiment, the DMC 14 generates the temporary token by hashing the certificate 22 of the DMR 16, adding (or appending) a UPnP UUID of the DMR 16, adding (or appending) one or more additional parameters, and signing the result. In this case, the temporary token may be represented as:

temporary token=DMC.sign(DMC.hash(DMRcertificate)+DMR_UUID+addParams), where "addParams" is the one or more additional parameters. The one or more additional parameters may include, e.g., one or more service parameters such as, for example, a service ID, a session ID, a user or subscriber ID for the media service 12, and/or a media content item (or asset) ID, or the like and/or one or more parameters of the DMR 16 such as, for example, a service ID of the DMR 16, a different device ID of the DMR 16 (e.g., Xid), or the like. In yet another embodiment, the DMC 14 generates the temporary token by hashing a combination of the certificate 22 of the DMR 16, the UPnP UUID of the DMR 16, and the one or more additional parameters, and then signs the result. In this case, the temporary token may be represented as:

temporary token=DMC.sign(DMC.hash(DMRcertificate+DMR_UUID+addParams)).

In another embodiment, the certificate 22 of the DMR 16 is a DTCP certificate. In this case, in one embodiment, the DMC 14 generates the temporary token by hashing DTCP certificate of the DMR 16 and signing the result. In this case, the temporary token may be represented as:

temporary token=DMC.sign(DMC.hash(DMR_DTCPcert)), where DMR_DTCPcert is the DTCP certificate of the DMR 16. In another embodiment, the DMC 14 generates the temporary token by hashing the DTCP certificate of the DMR 16, adding (or appending) the UPnP UUID of the DMR 16, and signing the result. In this case, the temporary token may be represented as:

temporary token=DMC.sign(DMC.hash(DMR_DTCPcert)+DMR_UUID).

In another embodiment, the DMC 14 extracts the Xid of the DMR 16 from the DTCP certificate of the DMR 16 and generates the temporary token by hashing the DTCP certificate, adding (or appending) the Xid of the DMR 16, and signing the result. In this case, the temporary token may be represented as:

temporary token=DMC.sign(DMC.hash(DMR_DTCPcert)+Xid).

In another embodiment, the DMC 14 generates the temporary token by hashing the DTCP certificate, adding (or appending) the Xid of the DMR 16 and one or more additional parameters, and signing the result. In this case, the temporary token may be represented as:

temporary token=DMC.sign(DMC.hash(DMR_DTCPcert)+Xid+addParams), where "addParams" is the one or more additional parameters. The one or more additional parameters may include, e.g., one or more service parameters such as, for example, a service ID, a session ID, a user or subscriber ID for the media service 12, and/or a media content item (or asset) ID, or the like and/or one or more parameters of the DMR 16 such as, for example, a service ID of the DMR 16, a different device ID of the DMR 16 (e.g., UPnP UUID of the DMR 16), or the like. In yet another embodiment, the DMC 14 generates the temporary token by hashing a combination of the DTCP certificate of the DMR 16, the Xid of the DMR 16, and one or more additional parameters, and then signing the result. In this case, the temporary token may be represented as:

temporary token=DMC.sign(DMC.hash(DMR_DTCPcert+Xid+addParams)).

The DMC 14 then sends the temporary token to the media service 12 (step 108). Notably, if the trust establishment procedure of step 104 is performed, the DMC 14 may generate the temporary token and send the temporary token to the media service 12 only if a trusted relationship is established between the DMC 14 and the DMR 16. Upon receiving the temporary token, the media service 12 stores the temporary token (step 110). In one embodiment, the temporary token itself is stored in association with the subscriber or user account with which the DMC 14 is associated.

Sometime thereafter, the protected media content push process 200 is performed. More specifically, the DMC 14 initiates a media content push from the media service 12 to the DMR 16 (step 202). Note that, as used herein, a "protected content push" refers to the concept of pushing media content with the temporary trust relation. The protected content push may alternatively be referred to as a secure content push. Further, the protected content push may or may not use other protection mechanisms such as, for example, DLNA content protection. In one embodiment, the media content push is a protected media content push, e.g., a DTCP-IP media content push. More specifically, in one embodiment, the DMC 14 sends an instruction to the DMR 16 to obtain a desired content item or service from the media service 12, e.g., by following a Uniform Resource Identifier (URI). In one embodiment, the URI is a secure URI (i.e., a Secure Hyper Text Transfer Protocol (HTTPS) URI). In another embodiment, the DMC 14 sends an instruction to the DMR 16 to obtain a Moving Picture Experts Group Dynamic Adaptive Streaming over HTTP Media Presentation Description (MPEG DASH MPD), where the DASH MPD contains a secure URI for the desired content item or service. In one embodiment, the secure URI is signed by the DMC 14. In another embodiment, the secure URI contains a unique session token received from the media service 12 and signed by the DMC 14.

In one particular embodiment, the instruction from the DMC 14 to the DMR 16 is a UPnP content push using a secure URI (i.e., an HTTPS URI). Further, in one embodiment, the UPnP content push is more specifically a UPnP content push to obtain MPEG DASH MPD, where the DASH MPD contains the secure URI, which in some embodiments may be signed by the DMC 14 or include a unique service session token from the media service 12. Still further, in another embodiment, the instruction from the DMC 14 to the DMR 16 is a DLNA content push using a secure URI (i.e., an HTTPS URI). Further, in one embodiment, the DLNA content push is more specifically a DLNA content push to obtain MPEG DASH MPD, where the DASH MPD contains the secure URI, which in some embodiments may be signed by the DMC 14 or include a unique service session token from the media service 12.

In response to the instruction from the DMC 14, the DMR 16 then requests the media content from the media service 12 (step 204). In response to the request from the DMR 16, the media service 12 obtains the certificate 22 of the DMR 16 (step 206). In this embodiment, the media service 12 obtains the certificate 22 from the DMR 16. In one embodiment, the media service 12 obtains the certificate 22 (e.g., X.509 v.3 digital certificate as used in Transport Layer Security (TLS)) of the DMR 16 via TLS client authentication. In another embodiment, the media service 12 obtains the certificate 22 and a device ID (e.g., UPnP UUID) of the DMR 16 via TLS handshake with extensions. Yet in another embodiment, the media service 12 obtains the certificate 22 (e.g. DTCP certificate) of the DMR 16 via TLS authorization procedure using DTCP certificate.

Then, the media service 12 validates, or authorizes, the DMR 16 based on the certificate 22 of the DMR 16 obtained in step 206 and the temporary token obtained from the DMC 14 in step 108 (step 208). More specifically, in one embodiment, the media service 12 generates a validation token based on the certificate 22 of the DMR 16 obtained in step 206 using the same procedure by which the DMC 14 generated the temporary token based on the certificate 22 of the DMR 16 obtained by the DMC 14 in step 102. Note that, in some embodiments, generation of the validation token may require additional information such as, for example, the device ID of the DMR 16 and/or one or more additional parameters. If the validation token matches the temporary token, the DMR 16 is validated for a temporary media session. Further, if the request from the DMR 16 is using a secure URI that is either signed by the DMC 14 or includes a session token provided by the media service 12 for the DMC 14, validation may also require verification of the signature of the secure URI as that of the DMC 14 and/or verification of the session token as that provided from the media service 12 to the DMC 14.

Once the DMR 16 is validated, the media service 12 starts a media session (step 210) and begins streaming the media content to the DMR 16 (step 212). However, since the DMR 16 is authorized for only a temporary media session, the media service 12 provides only temporary access to the media content for the DMR 16. For example, in one embodiment, the temporary token is a one-time token providing pre-authorization for a one-time media session. In this case, once the media session is terminated (e.g., when the DMR 16 stops playback), the DMR 16 is no longer authorized to access the media content. Any subsequent request from the DMR 16 is denied unless the DMC 14 pre-authorizes the DMR 16 for a new media session. However, in another embodiment, the media service 12 may retain the association between the temporary URI and the DMR 16 and reuse it in the future to, e.g., offer the user of the DMR 16 a promotional content or to sign up for the service.

Figure 3:
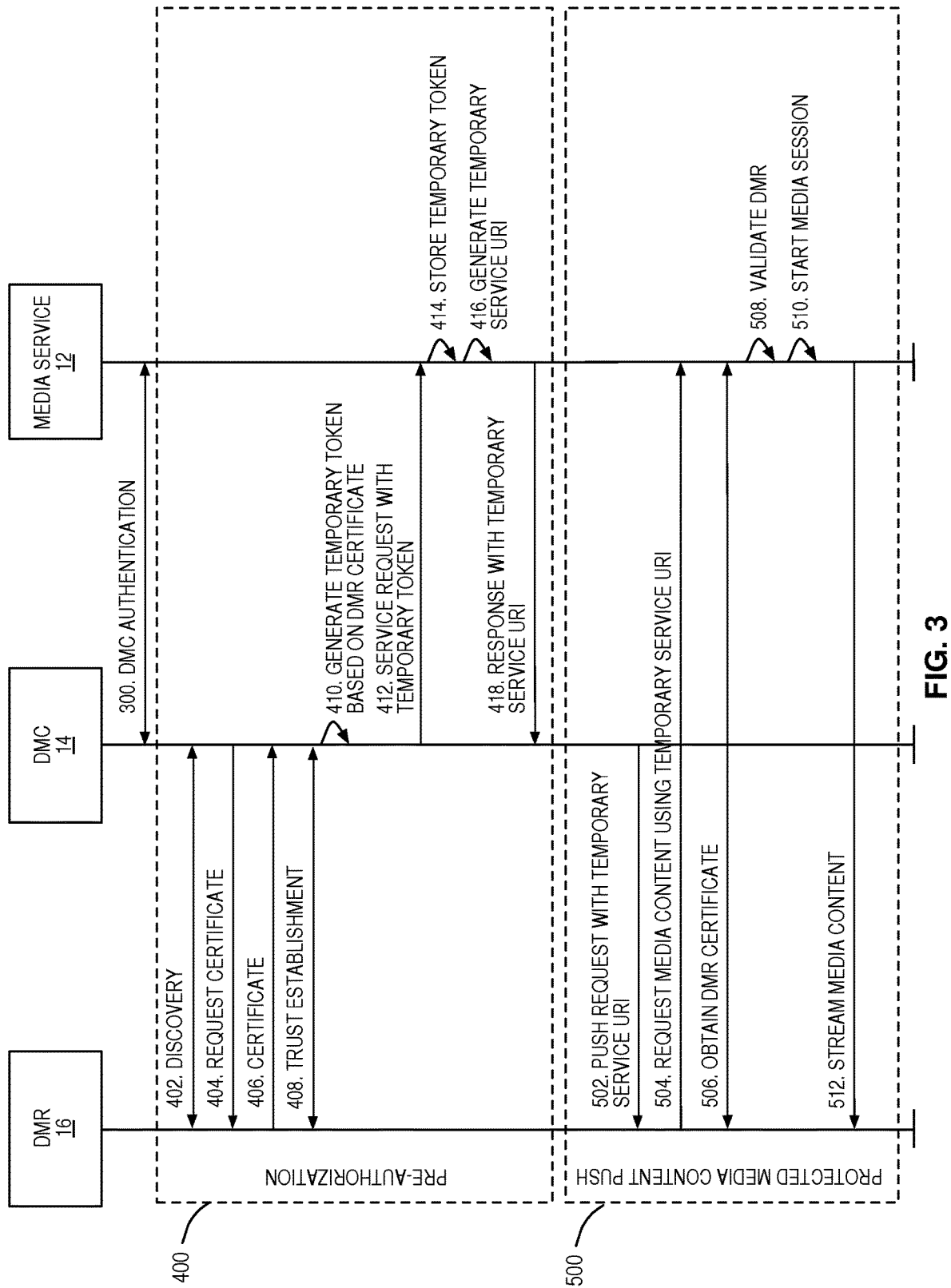
FIG. 3 illustrates the operation of the system of FIG. 1 according to another embodiment of the present disclosure.

FIG. 3 illustrates the operation of the system 10 of FIG. 1 according to another embodiment of the present disclosure. This embodiment is similar to that of FIG. 2. As illustrated, the DMC 14 first performs an authentication process with the media service 12 to thereby authenticate the DMC 14 (step 300). As a result, the DMC 14 has a trusted relationship with the media service 12. For example, a user of the DMC 14 may login to the media service 12 via the media service client 20 to, e.g., browse media content items such as television programs and movies available via the media service 12, browse an electronic programming guide (e.g., in a scenario where the media service 12 is an IPTV service), or play media content.

Next, a pre-authorization process 400 and a protected media content push process 500 are performed in a manner similar to that described above. More specifically, for the pre-authorization process 400, the DMC 14 discovers the DMR 16 (step 402). For example, in one embodiment, the DMC 14 performs UPnP discovery to thereby collect device information from the DMR 16 according to UPnP. The DMC 14 then requests the certificate 22 of the DMR 16 from the DMR 16 (step 404). In one embodiment, the request is an explicit request for the certificate 22 of the DMR 16. However, in another embodiment, the request is an implicit request for the certificate 22 of the DMR 16. As discussed above, in some embodiments, the DMC 14 obtains a device ID of the DMR 16 (e.g., a UPnP UUID of the DMR 16) in addition to the certificate 22 of the DMR 16. In response, the DMR 16 sends the certificate 22 of the DMR 16 to the DMC 14 (step 406).

Optionally, in some embodiments, the DMC 14 operates to establish a trusted relationship with the DMR 16 (step 408). This trusted relationship may be established using, e.g., a proximity authentication process. For example, in one embodiment, the DMC 14 performs a protected push of a verification indicia (e.g., an image or CAPTCHA of a character sequence) to the DMR 16 and then requests confirmation from a user of the DMC 14 that the correct verification indicia is displayed by the DMR 16. However, other procedures may be used to establish a trusted relationship between the DMC 14 and the DMR 16. Note that while the trust establishment procedure is illustrated as being performed after obtaining the certificate 22 of the DMR 16, the trust establishment procedure may be performed prior to or as part of the process used to obtain the certificate 22 of the DMR 16 from the DMR 16.

As discussed above, the DMC 14 generates a temporary token that pre-authorizes the DMR 16 for a media session based on the certificate 22 of the DMR 16 (step 410). As discussed above, the DMC 14 generates the temporary token based on the certificate 22 and, in some embodiments, one or more device parameters for the DMR 16 (e.g., a device ID of the DMR 16) and/or one or more service parameters. Any suitable process for generating the temporary token may be used. Some examples of such processes are given above. The DMC 14 then sends a service request to the media service 12, where the service request includes the temporary token (step 412). Notably, if the trust establishment procedure of step 408 is performed, the DMC 14 may generate the temporary token and send the service request including the temporary token to the media service 12 only if a trusted relationship is established between the DMC 14 and the DMR 16.

Upon receiving the service request, the media service 12 stores the temporary token (step 414). More specifically, in one embodiment, the media service 12 creates a temporary service record for a temporary service for the device (which in this case is the DMR 16) and maps the temporary service record to the account of the DMC 14. In addition, the media service 12 generates a temporary service URI for media content requested in the service request of step 412 (step 416) and returns the temporary service URI to the DMC 14 (step 418). Note that, strictly speaking, the temporary service URI does not have to be temporary. Rather, the URI may, e.g., stay is a service database and be reserved for the DMR 16 in case the DMR 16 wish to, e.g., subscribe to the media service 12. In one embodiment, the temporary service URI is created specifically for a media session with the DMR 16, which at this point is considered as pre-authorized (or in other words endorsed or recommended) by the DMC 14 (i.e., a trusted device). The temporary service URI may only be accessible temporarily (e.g., one-time and/or for a set amount of time, e.g., two hours). Further, the temporary service URI is, in one embodiment, a secure URI (e.g., an HTTPS URI). In one embodiment, the temporary service URI includes a unique session token that can be used, for example, in a subsequent validation process.

Sometime thereafter, the protected media content push process 500 is performed. The media content push is preferably a protected media content push, e.g. using a secure URI (HTTPS URI), and in some embodiments the protected content push may be using DTCP-IP procedures for media delivery. More specifically, the DMC 14 sends a push request to the DMR 16 to thereby initiate a media content delivery from the media service 12 to the DMR 16 (step 502). The push request includes the temporary service URI received from the media service 12 in step 418. The temporary service URI is, in some embodiments, signed by the DMC 14 prior to sending the temporary service URI to the DMR 16. In other embodiments, the temporary service URI contains a unique session token received from the media service 12 and signed by the DMC 14. In one embodiment, the DMC 14 sends the push request to initiate the media content push using UPnP (e.g., an UPnP creation connection).

More specifically, in one embodiment, the push request sent by the DMC 14 is an instruction to obtain a MPEG DASH MPD, where the DASH MPD contains the temporary service URI. In one particular embodiment, the instruction from the DMC 14 to the DMR 16 is a UPnP content push using the temporary session URI, where the temporary session URI is a secure URI (i.e., an HTTPS URI). Further, in one embodiment, the UPnP content push is more specifically a UPnP content push to obtain MPEG DASH MPD, where the DASH MPD contains the temporary session URI, which in some embodiments may be signed by the DMC 14 or include a unique service session token from the media service 12. Still further, in another embodiment, the instruction from the DMC 14 to the DMR 16 is a DLNA content push using the temporary session URI, where the temporary session URI is a secure URI (i.e., an HTTPS URI). Further, in one embodiment, the DLNA content push is more specifically a DLNA content push to obtain MPEG DASH MPD, where the DASH MPD contains the temporary session URI, which in some embodiments may be signed by the DMC 14 or include a unique service session token from the media service 12.

In response to the instruction from the DMC 14, the DMR 16 sends a request to the media service 12 using the temporary service URI (step 504). The request may be sent in the form of an HTTPS "get" request. The media service 12 then gets the certificate 22 of the DMR 16 from the DMR 16 (step 506). In one embodiment, the certificate 22 is a DTCP certificate, and the media service 12 gets the certificate 22 when setting up a Transport Layer Security (TLS) connection with supplemental data authorization. In one embodiment, this TLS connection is triggered by or is a result of the temporary service URI being a secure URI (e.g., an HTTPS URI). As part of the supplemental data authorization, the DMR 16 sends the certificate 22 of the DMR 16 to the media service 12. More specifically, during TLS handshaking, the DMR 16 provides the certificate 22 to the media service 12. While not essential for understanding the present disclosure, for more information regarding the exchange of a DTCP certificate when setting up a TLS connection, the interested reader is directed to Thakore, D., "Transport Layer Security (TLS) Authorization Using DTCP Certificate," Internet-Draft, Jul. 13, 2013.

Once the media service 12 has obtained the certificate 22 of the DMR 16, the media service 12 validates the DMR 16 based on the certificate 22 of the DMR 16 obtained in step 506 and the temporary token obtained from the DMC 14 in step 412 (step 508). As discussed above, in one embodiment, the media service 12 generates a validation token based on the certificate 22 of the DMR 16 obtained in step 506 using the same procedure by which the DMC 14 generated the temporary token based on the certificate 22 of the DMR 16 obtained by the DMC 14 in step 406. If the validation token matches the temporary token, the DMR 16 is validated for a temporary media session. Further, if the request from the DMR 16 is using a secure URI that is either signed by the DMC 14 or includes a session token provided by the media service 12 for the DMC 14, validation may also require verification of the signature of the secure URI as that of the DMC 14 and/or verification of the session token as that provided from the media service 12 to the DMC 14.

Once the DMR 16 is validated, the media service 12 starts a media session (step 510) and begins streaming the media content to the DMR 16 (step 512). However, since the DMR 16 is authorized for only a temporary media session, the media service 12 provides only temporary access to the media content for the DMR 16. For example, in one embodiment, the temporary token is a one-time token providing pre-authorization for a one-time media session. In this case, once the media session is terminated (e.g., when the DMR 16 stops playback), the DMR 16 is no longer authorized to access the media content. Any subsequent request from the DMR 16 is denied unless the DMC 14 pre-authorizes the DMR 16 for a new media session.

Figure 4:
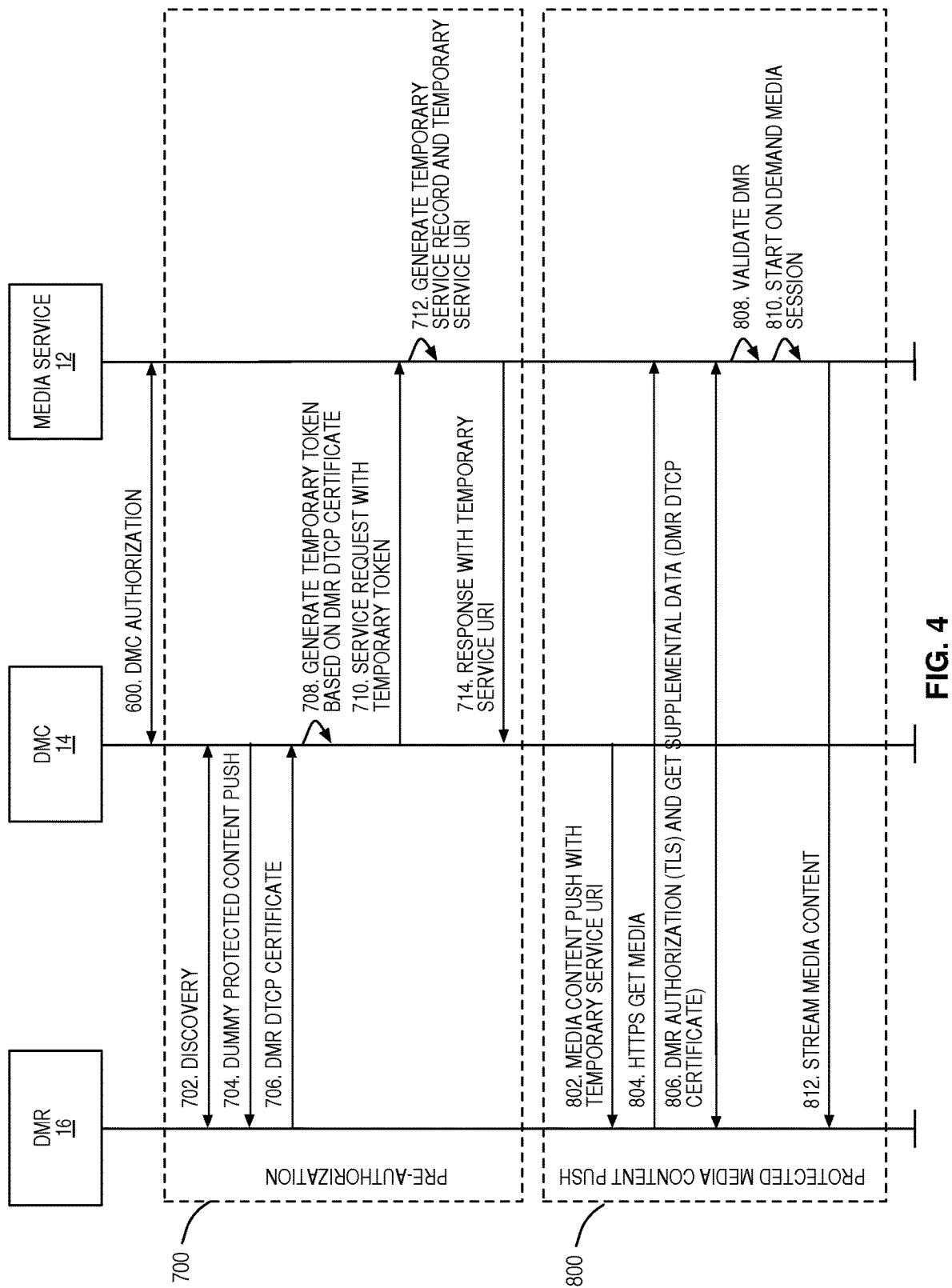
FIG. 4 illustrates the operation of the system of FIG. 1 according to another embodiment of the present disclosure.

FIG. 4 illustrates the operation of the system 10 of FIG. 1 according to another embodiment of the present disclosure. This embodiment is similar to that of FIGS. 2 and 3. In this embodiment, both the DMC 14 and the DMR 16 use basic UPnP audio video service, and both the DMC 14 and the DMR 16 are basic UPnP devices (i.e., they support UPnP discovery). In some embodiments, the DMC 14 and the DMR 16 are more advanced DLNA devices. Further, the DMC 14, the DMR 16, and the media service 12 contain a common encryption mechanism, e.g., they support TLS 1.2. Further, the DMC 14 has a trusted relationship with the media service 12 (e.g., a subscription) and is capable of establishing a trusted connection with the media service 12, e.g., over a TLS tunnel. Further, in this embodiment, the certificate 22 of the DMR 16 is a DTCP certificate. The DTCP certificate is preferably pre-provisioned on the DMR 16 by a Consumer Electronics (CE) manufacturer. This implies that the DMR 16 is DTLA certified for the consumption of protected content. The DMR 16 may be DTLA certified if, for example, the DMR 16 supports DLNA content protection. In some embodiments, the DMR 16 may use the certificate 22 to initiate encrypted sessions.

As illustrated, the DMC 14 first performs an authentication process with the media service 12 to thereby authenticate the DMC 14 (step 600). As a result, the DMC 14 has a trusted relationship with the media service 12. For example, a user of the DMC 14 may login to the media service 12 via the media service client 20 to, e.g., browse media content items such as television programs and movies available via the media service 12, browse an electronic programming guide (e.g., in a scenario where the media service 12 is an IPTV service), or play media content.

Next, a pre-authorization process 700 and a protected media content push process 800 are performed in a manner similar to that described above. More specifically, for the pre-authorization process 700, the DMC 14 performs UPnP discovery to thereby discover the DMR 16 (step 702). In this embodiment, in order to obtain the DTCP certificate (i.e., the certificate 22) of the DMR 16, the DMC 14 uses UPnP actions to initiate a dummy, or fake, protected content session (push) with the DMR 16 (step 704). For link protected content, the DMC 14 will get the DTCP certificate of the DMR 16. As an UPnP DMC (or DLNA push controller), it is sufficient to initiate a push of dummy DTCP protected content to the DMR 16 using basic UPnP mechanisms. After this push request, the DMR 16 will respond with a DTCP authentication request including the DTCP certificate of the DMR 16, which includes a DTLA Xid of the DMR 16. Thus, the initiation of the dummy protected content session can be viewed as an implicit request for the DTCP certificate of the DMR 16. In response to the initiation of the dummy protected content push, the DMR 16 provides the DTCP certificate of the DMR 16 to the DMC 14 in the DTCP authentication request, as described above (step 706). At this point, no further authentication is needed as there may be no DTCP session between the DMC 14 and the DMR 16. As such, the DMC 14 can terminate the DTLA authentication session.

Optionally, in some embodiments, the DMC 14 operates to establish a trusted relationship with the DMR 16. As discussed above, in one embodiment, the trust establishment procedure may be performed separately from obtaining the certificate 22 of the DMR 16. However, in another embodiment, the trust establishment procedure may be performed as part of the process used to obtain the certificate 22 of the DMR 16 from the DMR 16. For example, in one embodiment, the dummy protected content push of step 704 may be used to push a verification indicia (e.g., an image or CAPTCHA of a character sequence) to the DMR 16 for display. The DMC 14 may then request confirmation from a user of the DMC 14 that the correct verification indicia are displayed by the DMR 16. However, other procedures may be used to establish a trusted relationship between the DMC 14 and the DMR 16.

The DMC 14 then generates a temporary token that pre-authorizes the DMR 16 for a media session based on the certificate 22 of the DMR 16 (step 708). In this embodiment, the temporary token is a combination of a hash value generated from the DTCP certificate of the DMR 16 and the Xid of the DMR 16 extracted from the DTCP certificate of the DMR 16, where the result of the combination is signed by the DMC 14. More specifically, in one embodiment, the temporary token is generated based on the hash value of the DTCP certificate of the DMR 16 (and optionally one or more service parameters and/or one or more device parameters of the DMR 16 as discussed above). In another embodiment, the temporary token can include a UUID generated according to the algorithm for creating a name-based UUID described in Section 4.3 of RFC 4122. The result is a unique name (i.e., a UUID) within a corresponding namespace. The temporary token constitutes a trust relationship endorsed by the DMC 14.

The DMC 14 then sends a service request to the media service 12 for a temporary media session for the DMR 16, where the service request includes the temporary token signed with a certificate of the DMC 14 (step 710). At this point, the DMR 16 may be referred to as a temporarily trusted device. Notably, the certificate of the DMC 14 is known to the media service 12 (e.g., known to the media service 12 and used to create a TLS connection between the DMC 14 and the media service 12). The media service 12 creates a temporary service record and generates a temporary service URI for a temporary service for the DMR 16 having the hash value and Xid (and optionally other parameters as discussed above) combination from the temporary token (step 712). Note that, strictly speaking, the temporary service URI does not have to be temporary. Rather, the URI may, e.g., stay in a service database and be reserved for the DMR 16 in case the DMR 16 wishes to, e.g., subscribe to the media service 12. The media service 12 maps the temporary service record to the account of the DMC 14. In one embodiment, the temporary service URI is created specifically for a media session with the DMR 16, which at this point is considered as pre-authorized (or in other words endorsed or recommended) by the DMC 14 (i.e., a trusted device). The temporary service URI may only be accessible temporarily (e.g., one-time and/or for a set amount of time, e.g., two hours). The media service 12 sends a response to the service request of step 710 to the DMC 14, where the response includes the temporary service URI for the temporary media session of the DMR 16 (step 714). In this embodiment, the temporary service URI is an HTTPS URI. In one embodiment, the temporary service URI includes a unique session token that can be used, for example, in a subsequent validation process.

Sometime thereafter, the protected media content push process 800 is performed. More specifically, the DMC 14 sends a protected content push request to the DMR 16 to thereby initiate a media content delivery from the media service 12 to the DMR 16 (step 802). The push request includes the temporary service URI received from the media service 12 in step 714. The protected content push may be performed according to any of the embodiments described above with respect to step 502 of FIG. 3. In this embodiment, the DMC 14 sends the protected content push request to initiate the media content push using UPnP (e.g., an UPnP connection creation). Note that the temporary service URI is only one example of a parameter that can be used to establish the temporary media session. Any parameter(s) needed by the DMR 16 to establish a temporary media session with the media service 12 can be communicated from the media service 12 to the DMC 14 and then from the DMC 14 to the DMR 16.

In response to the protected content push request, the DMR 16 sends a request to the media service 12 using the temporary service URI in the form of, in this embodiment, an HTTPS "get" request (step 804). The media service 12 and the DMR 16 then perform a TLS authorization process with supplemental data authorization (step 806). During the TLS authorization process, the DTCP certificate of the DMR 16 is sent from the DMR 16 to the media service 12. More specifically, during TLS handshaking, the DMR 16 provides the DTCP certificate of the DMR 16 to the media service 12. Again, while not essential for understanding the present disclosure, for more information regarding the exchange of a DTCP certificate when setting up a TLS connection, the interested reader is directed to Thakore, D., "Transport Layer Security (TLS) Authorization Using DTCP Certificate," Internet-Draft, Jul. 13, 2013.

The media service 12 then validates the DMR 16 based on the DTCP certificate of the DMR 16 obtained in step 806 and the temporary token obtained from the DMC 14 in step 710 (step 808). More specifically, as discussed above, the media service 12 generates a validation token based on the DTCP certificate of the DMR 16 obtained in step 806 using the same process used by the DMC 14 to generate the temporary token obtained from the DMC 14 in step 710. If the validation token matches the temporary token, the DMR 16 is validated for a temporary media session. Further, if the request from the DMR 16 is using a secure URI that is either signed by the DMC 14 or includes a session token provided by the media service 12 for the DMC 14, validation may also require verification of the signature of the secure URI as that of the DMC 14 and/or verification of the session token as that provided from the media service 12 to the DMC 14.

Once the DMR 16 is validated, the media service 12 starts an on demand media session (step 810) and begins streaming the media content to the DMR 16 (step 812). However, since the DMR 16 is authorized for only a temporary media session, the media service 12 provides only temporary access to the media content for the DMR 16. For example, in one embodiment, the temporary token is a one-time token providing pre-authorization for a one-time media session. In this case, once the media session is terminated (e.g., when the DMR 16 stops playback), the DMR 16 is no longer authorized to access the media content. Any subsequent request from the DMR 16 is denied unless the DMC 14 pre-authorizes the DMR 16 for a new media session.

Figure 5:
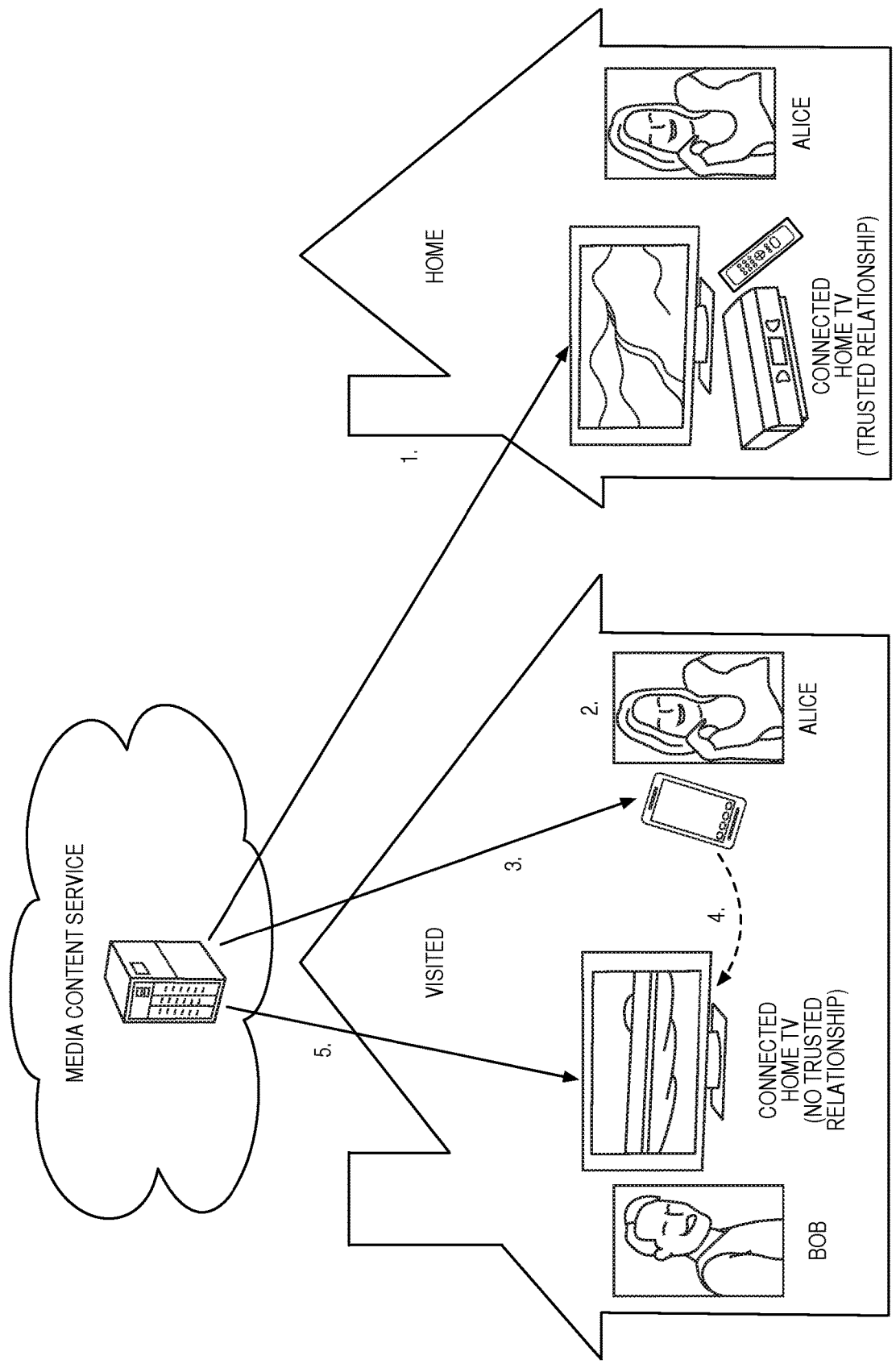
FIG. 5 illustrates one example of a use case for one embodiment of the present disclosure.

FIG. 5 illustrates an example use case that illustrates at least features of at least some embodiments of the present disclosure. In this use case, Alice enjoys a media content service (i.e., network-based) service at home on a connected television (1). Sometime thereafter, Alice visits her friend Bob with, e.g., a DLNA enabled smartphone (2). Using her smartphone, Alice connects to the premium content media service and locates a media content item (e.g., a movie) that she would like to share with Bob (3). Alice uses her smartphone to push the media content item from the media content service to Bob's DLNA television (4). More specifically, Alice's smartphone gets the DTCP certificate of Bob's DLNA television, generates a temporary token, and sends a service request to the media content service with the signed temporary token. The media content service returns a temporary service URI to Alice's smartphone, which in turn initiates a protected media content push to Bob's DLNA television. Using the temporary service URI, Bob's DLNA television requests the desired media content item from the media content service. The media content service then obtains the DTCP certificate from Bob's DLNA television, validates Bob's DLNA television, starts a temporary media session, and begins streaming the desired media content item to Bob's DLNA television. Alice and Bob then enjoy watching the desired media content item from Alice's media content service on Bob's DLNA television (5).

Figure 6:
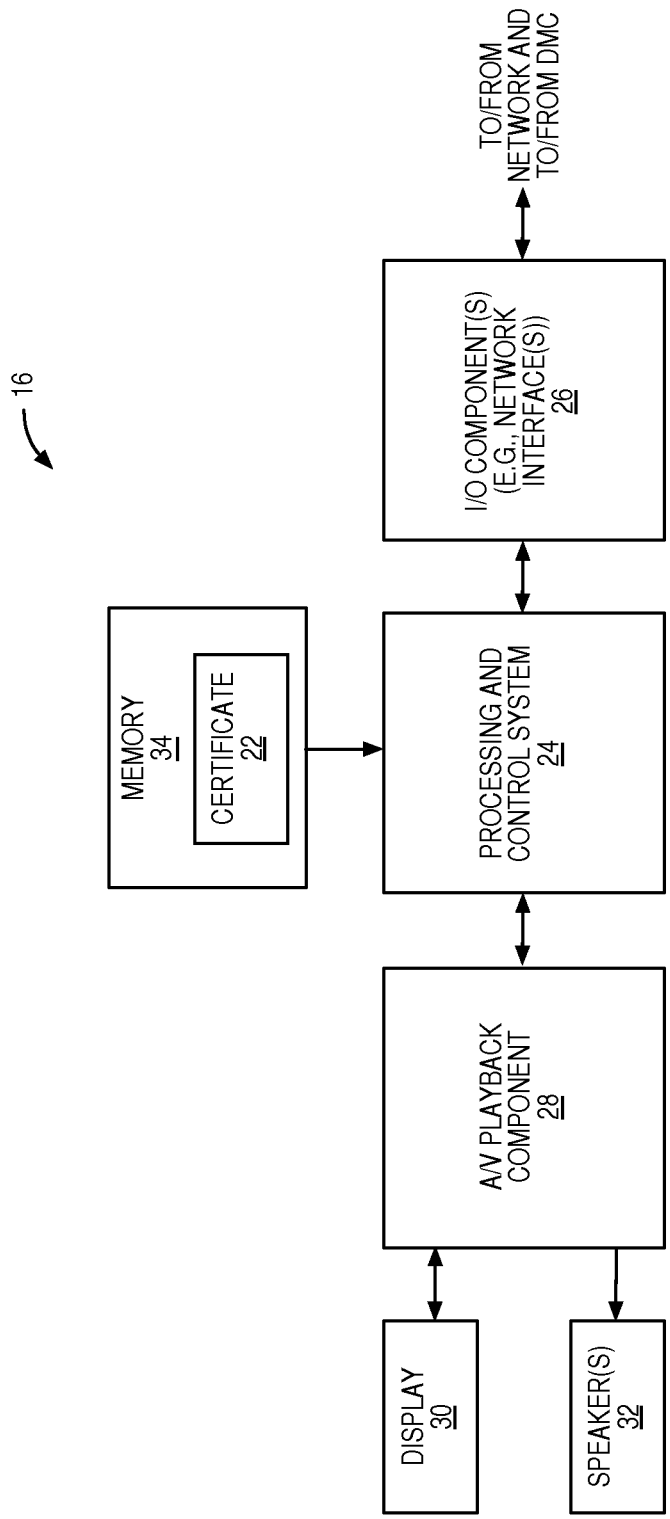
FIG. 6 is a block diagram of one example of the DMR of FIG. 1 according to one embodiment of the present disclosure.

FIG. 6 is a block diagram of one example of the DMR 16. In this example, the DMR 16 includes a processing and control system 24, one or more Input/Output (I/O) components 26, and an Audio/Video (A/V) playback component 28. In addition, in this embodiment, the DMR 16 includes an integrated display 30 and one or more integrated speakers 32. Note, however, that the display 30 and/or the speaker(s) 32 may be external to the DMR 16. The certificate 22 is stored in memory 34. The processing and control system 24 includes one or more hardware components, e.g., one or more processors that provide functionality of the DMR 16 (e.g., UPnP functionality, TLS connection setup and authentication, etc.). This functionality may be implemented in the hardware itself and/or implemented in software that, when executed by a processor(s), causes the DMR 16 to perform the functionality.

The I/O component(s) 26 include one or more hardware components (e.g., network interfaces) to enable communication with the media service 12 over the WAN 18 and communication with the DMC 14. For example, the I/O component(s) 26 may include a wireless LAN interface (e.g., an IEEE 802.11x network interface card). The A/V playback component 28 operates to provide playback of digital media content streamed from the media service 12. The A/V playback component 28 is implemented in hardware or a combination of hardware and software.

Figure 7:
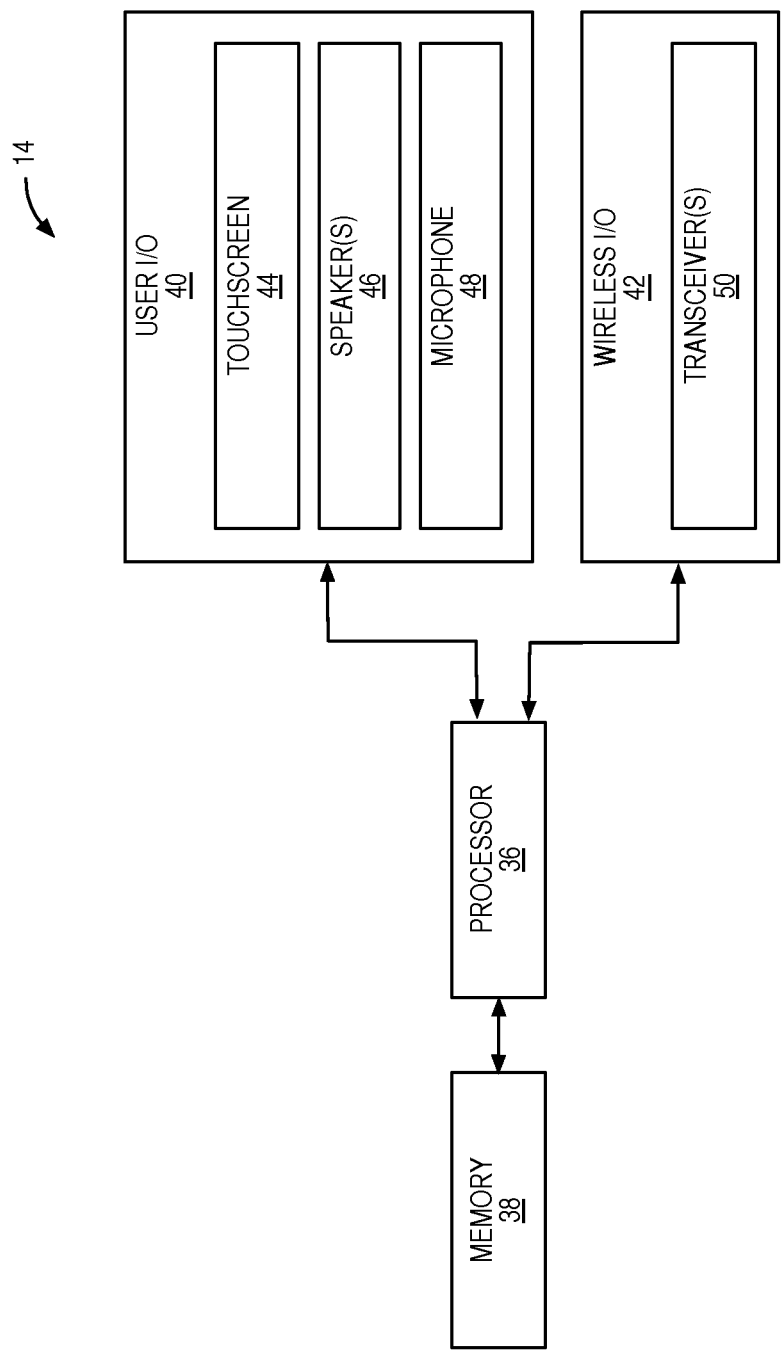
FIG. 7 is a block diagram of one example of the Digital Media Controller (DMC) of FIG. 1 according to one embodiment of the present disclosure.

FIG. 7 is a block diagram of one example of the DMC 14. In this example, the DMC 14 includes a processor 36, memory 38, user I/O component(s) 40, and wireless I/O component(s) 42. In one embodiment, the functionality of the DMC 14 described above is implemented in software stored in the memory 38 and executed by the processor 36 to thereby cause the DMC 14 to operate according to any one of the embodiments described herein. The user I/O component(s) 40 may include, for example, a touchscreen display 44, a speaker(s) 46, a microphone 48, or the like, or any combination thereof. The wireless I/O component(s) 42 include, in this example, one or more transceivers 50 that provide wireless connectivity to the DMR 16 and the WAN 18. For example, the transceiver(s) 50 may include a wireless LAN interface (e.g., an IEEE 802.11x network interface card).

Figure 8:
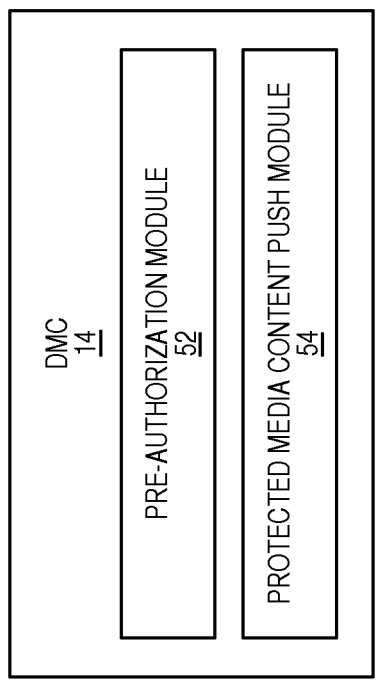
FIG. 8 illustrates the DMC of FIG. 1 according to another embodiment of the present disclosure.

FIG. 8 illustrates the DMC 14 according to another embodiment of the present disclosure. As illustrated, the DMC 14 includes a pre-authorization module 52 and a protected media content push module 54 that are each implemented in software that, when executed by a processor of the DMC 14, causes the DMC 14 to operate according to any one of the embodiments described herein. The pre-authorization module 52 operates to provide the functionality of the DMC 14 with respect to the pre-authorization process 100, 400, or 700 described above. Likewise, the protected media content push module 54 operates to provide the functionality of the DMC 14 with respect to the protected media content push process 200, 500, or 800 described above.

In one embodiment, a computer program including instructions which, when executed by at least one processor, causes the at least one processor to carry out the functionality of the DMC 14 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 38).

Figure 9:
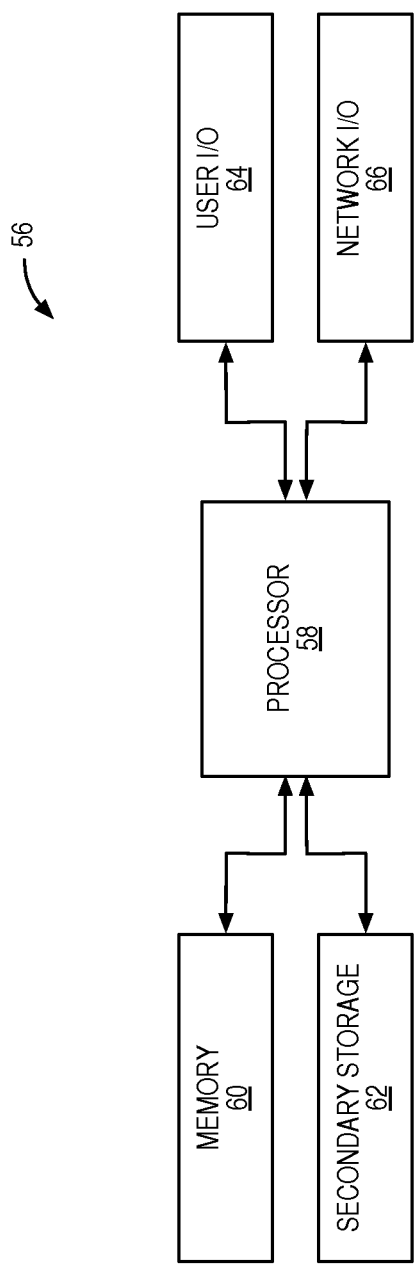
FIG. 9 is a block diagram of a server hosting the media service of FIG. 1 according to one embodiment of the present disclosure.

FIG. 9 is a block diagram of a server 56 hosting or providing the media service 12 according to one embodiment of the present disclosure. As illustrated, the server 56 (which may also be referred to as a server computer) includes a processor 58, memory 60, secondary storage 62, user I/O component(s) 64, and network I/O component(s) 66. In one embodiment, the media service 12, or the functionality of the media service 12 described with respect to any one of the embodiments described herein, is implemented in software that is stored in, e.g., the memory 60 and executed by the processor 58. The secondary storage 62 may be used to, e.g., store media content items (e.g., movies and television shows) that are available to subscribers of the media service 12. The secondary storage 62 may be part of the server 56 and/or be part of a remote or distributed storage system or network. The user I/O component(s) 64 may include, for example, any components that enable a user to interact with the server 56 (e.g., display port(s), keyboard port, etc.). The network I/O component(s) 66 include one or more components (e.g., network interface card(s)) that connect the server 56 to the WAN 18.

Figure 10:
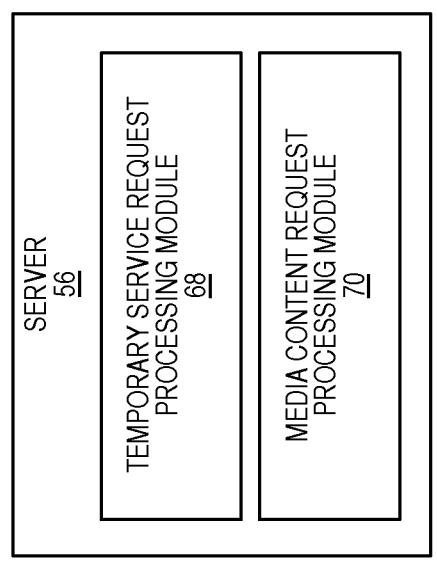
FIG. 10 is a block diagram of a server hosting the media service of FIG. 1 according to another embodiment of the present disclosure.

FIG. 10 illustrates the server 56 according to another embodiment of the present disclosure. As illustrated, the server 56 includes a temporary service request processing module 68 and a media content request processing module 70, each of which is implemented in software that, when executed by a processor of the server 56 (e.g., the processor 58), causes the server 56 to operate to provide the functionality of the media service 12 according to any one of the embodiments described herein. The temporary service request processing module 68 operates to provide the functionality of the media service 12 with respect to the pre-authorization process 100, 400, or 700 described above. Likewise, the media content request processing module 70 operates to provide the functionality of the media service 12 with respect to the protected media content push process 200, 500, or 800 described above.

In one embodiment, a computer program including instructions which, when executed by at least one processor, cause the at least one processor to carry out the functionality of the media service 12 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 60).

The following acronyms are used throughout this disclosure.

A/V Audio/Video
CE Consumer Electronics
DLNA Digital Living Network Alliance
DMC Digital Media Controller
DMR Digital Media Renderer
DTLA Digital Transmission Licensing Administrator
DTCP-IP Digital Transmission Content Protection over Internet Protocol
HDMI High-Definition Multimedia Interface
HTTP Hyper Text Transfer Protocol
HTTPS Secure Hyper Text Transfer Protocol
ID Identifier
I/O Input/Output
IPTV Internet Protocol Television
LAN Local Area Network
MAC Media Access Control
MPEG DASH MPD Moving Picture Experts Group Dynamic Adaptive Streaming over Hyper Text Transfer Protocol Media Presentation Description
SOAP Simple Object Access Protocol
TLS Transport Layer Security
UPnP Universal Plug and Play
URI Uniform Resource Identifier
USB Universal Serial Bus
UUID Universal Unique Identifier
WAN Wide Area Network
Xid Device Identifier Those skilled in the art will recognize improvements and modifications to the embodiments of the present disclosure. All such improvements and modifications are considered within the scope of the concepts disclosed herein and the claims that follow.

What is claimed is:

1. A method of operation of a first device having a trusted relationship with a network-based media service to establish a temporary trust relationship between the network-based media service and a second device, the method comprising:

obtaining, by the first device, a certificate of the second device, the second device being a device that does not have a trusted relationship with the network-based media service;

generating, by the first device, a temporary token that pre-authorizes the second device for a temporary media session with a server to receive the network-based media service based on the certificate of the second device and one or more service parameters of the second device, wherein the one or more service parameters comprises a service identifier (ID) and a session ID, and wherein the temporary token is generated by hashing the certificate of the second device and signing the hashed certificate with a certificate of the first device; and sending, by the first device, the temporary token for the second device to the server that provides the network-based media service.

2. The method of claim 1, wherein sending the temporary token comprises sending a service request including the temporary token to the server that provides the network-based media service.

3. The method of claim 2, further comprising, in response to sending the service request to the server that provides the network-based media service, receiving a response including a temporary service Uniform Resource Identifier (URI) from the server that provides the network-based media service.

4. The method of claim 3, further comprising sending an instruction to the second device including the temporary service URI to obtain media content from the network-based media service using the temporary service URI.

5. The method of claim 1, wherein the certificate of the second device is a Digital Transmission Content Protection (DTCP) certificate of the second device, and obtaining the certificate of the second device comprises:

sending a dummy protected content request to the second device; and in response, receiving the DTCP certificate of the second device from the second device.

6. The method of claim 1, wherein the certificate of the second device is a Digital Transmission Content Protection (DTCP) certificate of the second device, and obtaining the certificate of the second device comprises:

sending a dummy protected content request to the second device to push a verification indicia to the second device for display; and in response, receiving the DTCP certificate of the second device from the second device, wherein the method further comprises confirming that the verification indicia is correctly displayed by the second device prior to sending the temporary token for the second device to the server that provides the network-based media service.

7. The method of claim 1, wherein generating the temporary token for the second device further comprises generating the temporary token based on the certificate of the second device and one or more parameters selected from a group consisting of: said one or more service parameters of the second device and one or more device parameters of the second device.

8. A first device comprising:

a processor; and memory containing instructions executable by the processor, whereby the first device is operative to:

obtain a certificate of a second device that does not have a trusted relationship with a network-based media service;

generate a temporary token that pre-authorizes the second device for a temporary media session with a server to receive the network-based media service based on the certificate of the second device and one or more service parameters of the second device, wherein the one or more service parameters comprises a service identifier (ID) and a session ID, and wherein to generate the temporary token, by the instructions executable by the processor, the first device is further operative to, hash the certificate of the second device and sign the hashed certificate with a certificate of the first device; and send the temporary token for the second device to the server that provides the network-based media service.

9. The first device of claim 8, wherein, by the instructions executable by the processor, the first device is further operative to, in order to obtain the certificate of the second device:

send a dummy protected content request to the second device; and in response receive a Digital Transmission Content Protection (DTCP) certificate of the second device from the second device.

10. The first device of claim 8, wherein, by the instructions executable by the processor, the first device is further operative to, in order to generate the temporary token for the second device, generate the temporary token for the second device based on the certificate of the second device and at least one parameter selected from a group consisting of: said one or more service parameters of the second device and one or more device parameters of the second device.

11. The first device of claim 8, wherein, by the instructions executable by the processor, the first device is further operative to:

in order to send the temporary token to the server that provides the network-based media service, send a service request including the temporary token to the server that provides the network-based media service;

receive a response including a temporary service Uniform Resource Identifier (URI) from the server that provides the network-based media service; and send a protected content push request to the second device including the temporary service URI.

12. A server that provides a network-based media service, the server comprising:

a processor; and memory containing instructions executable by the processor, whereby the server is operative to:

receive, from a first device having a trusted relationship with the network-based media service, a temporary token for a second device that does not have a trusted relationship with the network-based media service, wherein the temporary token pre-authorizes the second device for a temporary media session with the server to receive the network-based media service;

receive a request from the second device;

in response to the request, obtain a certificate of the second device from the second device;

validate the second device based on the certificate of the second device and the temporary token for the second device; and upon validating the second device, start the temporary media session with the second device, wherein the temporary token for the second device, received from the first device, is based on the certificate of the second device and one or more service parameters of the second device, wherein the one or more service parameters comprises a service identifier (ID) and a session ID, and wherein the temporary token is generated by hashing the certificate of the second device and signing the hashed certificate with a certificate of the first device.

13. The server of claim 12, wherein, by the instructions executable by the processor, the server is further operative to, in order to receive the temporary token for the second device:

receive a service request including the temporary token for the second device from the first device.

14. The server of claim 13, wherein, by the instructions executable by the processor, the server is further operative to:

prior to receiving the request from the second device, send a response to the service request to the first device that includes a temporary service Uniform Resource Identifier (URI).

15. The server of claim 14, wherein the request from the second device is a request for the temporary service URI.

16. The server of claim 15, wherein:

the certificate of the second device is a Digital Transmission Control Protection (DTCP) certificate; and by the instructions executable by the processor, the server is further operative to, in order to obtain the certificate of the second device:

in response to the request from the second device for the temporary service URI, obtain the DTCP certificate from the second device during a Transport Layer Security (TLS) handshake procedure with the second device.

17. The server of claim 12, wherein, by the instructions executable by the processor, the server is further operative to, in order to validate the second device:

generate a validation token based on the certificate of the second device using the same temporary token generation procedure utilized by the first device to generate the temporary token for the second device; and validate the second device if the validation token matches the temporary token for the second device.

18. The server of claim 12, wherein, by the instructions executable by the processor, the server is further operative to stream media content to the second device during the temporary media session.

19. The server of claim 12, wherein the temporary token for the second device expires once the temporary media session is ended.

* * * * *